(12) United States Patent
Kato et al.

(10) Patent No.: US 6,217,134 B1
(45) Date of Patent: Apr. 17, 2001

(54) ANTI-SKID CONTROL SYSTEM FOR AN AUTOMOTIVE VEHICLE

(75) Inventors: Toshihisa Kato, Anjo; Yasuhiro Abe, Toyota; Shinsuke Sakane, Aichi pref., all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/407,948

(22) Filed: Sep. 29, 1999

(30) Foreign Application Priority Data

Sep. 30, 1998 (JP) .................................................. 10-294604

(51) Int. Cl.$^7$ ............................... B60T 8/66; B60T 8/32; B60T 8/70; B60T 8/58
(52) U.S. Cl. .......................... 303/158; 303/177; 303/156
(58) Field of Search .................................... 303/158, 177, 303/156, 171, 173, 178, 199; 701/70, 71, 78, 80, 79; 188/181 A (56) References Cited

U.S. PATENT DOCUMENTS

| | | |
|---|---|---|
| 4,384,330 * | 5/1983 | MAtsuda et al. . |
| 4,637,663 * | 1/1987 | Matsuda . |
| 4,666,218 * | 5/1987 | Masaki et al. . |
| 4,762,375 * | 8/1988 | Maki et al. . |
| 5,072,393 * | 12/1991 | Mori et al. . |
| 5,220,506 * | 6/1993 | Kuwana et al. . |
| 5,236,255 * | 8/1993 | Kuwana et al. . |
| 5,249,849 * | 10/1993 | Sakata . |
| 5,280,432 * | 1/1994 | Kuwana et al. . |
| 5,295,738 * | 3/1994 | Matsuura et al. . |
| 5,498,072 * | 3/1996 | Shimizu . |

FOREIGN PATENT DOCUMENTS

| | | |
|---|---|---|
| 4-345567 | 12/1992 | (JP) . |
| 8-150918 | 6/1996 | (JP) . |

* cited by examiner

Primary Examiner—Douglas C. Butler
(74) Attorney, Agent, or Firm—Burns, Doane, Swecker & Mathis, LLP (57) ABSTRACT

The present invention is directed to an anti-skid control system wherein at least a pressure decrease mode for decreasing a hydraulic braking pressure and a pulse pressure increase mode for intermittently increasing the hydraulic braking pressure, with a pressure increasing signal provided in accordance with the braking condition of a vehicle. Peaks of the wheel speed in the pulse pressure increase mode are detected continuously on the basis of a variation of a wheel acceleration relative to a vehicle acceleration. Then, the time when each peak of the wheel speed was detected is set as a rise timing of the pressure increasing signal in the pulse pressure increase mode, and a time period for which the pressure increasing signal outputs is adjusted, on the basis of a variation of the rotating condition of the wheel at the time when the peak of the wheel speed was detected. The time period for which the pressure increasing signal outputs may be set on the basis of a ratio of a first integrated value of a difference obtained by subtracting the vehicle acceleration from the wheel acceleration, to a second integrated value of a difference obtained by subtracting the wheel acceleration from the vehicle acceleration.

6 Claims, 6 Drawing Sheets

ANTI-SKID CONTROL SYSTEM FOR AN AUTOMOTIVE VEHICLE

This application claims priority under 35 U.S.C. Sec. 119 to No.10-294604 filed in Japan on Sep. 30, 1998, the entire content of which is herein incorporated by reference.

BACKGROUND OF THE INVENTION

1. Field of the Invention

The present invention relates to an anti-skid control system for an automotive vehicle, wherein brake pressure in each wheel brake cylinder is controlled in accordance with pressure control modes including a pulse pressure increase mode.

2. Description of the Related Arts

Various anti-skid control systems have been proposed heretofore to prevent a wheel from being locked during a braking operation of a vehicle. For example, Japanese Patent Laid-open Publication No.8-150918 discloses an anti-skid control system which is adapted to compare a wheel acceleration with a vehicle acceleration at a predetermined time, and adjust a pressure increasing rate of braking pressure, based upon the result of comparison. According to that publication, in view of a prior anti-skid control system as disclosed in Japanese Patent Laid-open Publication No.4-345567, which was aimed to provide an appropriate pressure increasing rate in accordance with the slip rate under such a condition as the coefficient of friction of a road (hereinafter, abbreviated as a road $\mu$) or the like is constant, thereby to achieve an ideal braking force control, it was proposed to solve such a problem that the ideal braking force control could not necessarily be achieved by that prior anti-skid control system, when the condition such as the coefficient of friction of the road was varied.

According to the anti-skid control system as disclosed in the aforementioned Japanese Patent Laid-open Publication No.8-150918, however, when a vehicle travels on a rough road, which includes unpaved road, stone pavement, snow road or the like, it will not be easy to perform the anti-skid control operation appropriately, because not only the road $\mu$ will vary, but also the vehicle wheels will vibrate. This is because the detected wheel acceleration will include the variation due to disturbance caused by change of the road surface, so that comparing the wheel acceleration with the vehicle acceleration at the predetermined time, i.e., at the specific time determined in advance will result in the comparison between the wheel acceleration and the vehicle acceleration including the variations caused by the disturbance of the road surface.

SUMMARY OF THE INVENTION

Accordingly, it is an object of the present invention to provide an anti-skid control system for performing the braking force control, appropriately and effectively, even when a vehicle is traveling on a rough road.

In accomplish the above object, the anti-skid control system includes wheel brake cylinders which are operatively mounted on wheels of the vehicle, respectively, a pressure generator which is adapted to pressurize brake fluid in response to operation of a manually operated member to generate a hydraulic braking pressure, and supply the hydraulic braking pressure to each of the wheel brake cylinders, and a pressure control device which is disposed between the wheel brake cylinders and the pressure generator. The pressure control device is adapted to set at least a pressure decrease mode for decreasing the hydraulic braking pressure and a pulse pressure increase mode for intermittently increasing the hydraulic braking pressure, with a pressure increasing signal provided in accordance with the braking condition of the vehicle, to control the hydraulic braking pressure in each of the wheel brake cylinders. A wheel acceleration detection device is provided for detecting a wheel acceleration of each wheel of the vehicle, and a vehicle acceleration detection device is provided for detecting a vehicle acceleration of the vehicle. A wheel speed peak detection device is provided for detecting peaks of the wheel speed in the pulse pressure increase mode continuously on the basis of a variation of the wheel acceleration detected by the wheel acceleration detection device relative to the vehicle acceleration detected by the vehicle acceleration detection device. And, a pulse pressure increase mode adjusting device is provided for setting the time when each peak of the wheel speed was detected by the wheel speed peak detection device as a rise timing of the pressure increasing signal in the pulse pressure increase mode, and adjusting a time period for which the pressure increasing signal outputs, on the basis of a variation of the rotating condition of the wheel at the time when the peak of the wheel speed was detected.

Preferably, the wheel acceleration detection device is adapted to differentiate the wheel speed to obtain the wheel acceleration, and the vehicle acceleration detection device is adapted to calculate an estimated vehicle speed on the basis of the wheel speed, and differentiate the estimated vehicle speed to obtain the vehicle acceleration. According to the system as described above, peaks of the wheel speed in the pulse pressure increase mode are detected continuously on the basis of a variation of the wheel acceleration relative to the vehicle acceleration, and the time when each peak of the wheel speed was detected is set as a rise timing of the pressure increasing signal in the pulse pressure increase mode, and a time period for which the pressure increasing signal outputs is adjusted, on the basis of a variation of the rotating condition of the wheel at the time when the peak of the wheel speed was detected. As a result, the pulse pressure increase control can be performed in such a manner that immediately after the braking torque is applied to the wheel, the tire torque will be applied to it. Therefore, the braking force can be applied properly to the wheel properly without being influenced by the wheel vibration. As for factors for determining the rotating condition of the wheel, may be employed the variation of wheel speed, wheel acceleration, or a slip rate, based on which the output time of the pressure increasing signal can be adjusted.

In the anti-skid control system as described above, therefore, the pulse pressure increase mode adjusting device may be adapted to adjust the time period for which the pressure increasing signal outputs, on the basis of a ratio of a first integrated value of a difference obtained by subtracting the vehicle acceleration from the wheel acceleration, to a second integrated value of a difference obtained by subtracting the wheel acceleration from the vehicle acceleration. For instance, the time period of the pressure increasing signal may be set to be shorter, as the ratio of the first integrated value to the second integrated value is reduced.

The anti-skid control system as described above may further include a wheel speed detection device for detecting wheel speeds of the wheels of the vehicle, a vehicle speed detection device for detecting a vehicle speed of the vehicle, and a slip rate calculation device for calculating a slip rate on the basis of the wheel speeds detected by the wheel speed detection device and the vehicle speed detected by the vehicle speed detection device. And, the pulse pressure increase mode adjusting device may be adapted to adjust the time period for which the pressure increasing signal is output, on the basis of the slip rate calculated by the slip rate calculation device at the time when the peak of the wheel speed was detected. For instance, the time period of the pressure increasing signal may be set to be shorter, as the slip rate calculated by the slip rate calculation device is close to the slip rate at a peak of the coefficient of friction of the road.

BRIEF DESCRIPTION OF THE DRAWINGS

The above stated object and following description will become readily apparent with reference to the accompanying drawings, wherein like reference numerals denote like element d in which.

DESCRIPTION OF THE PREFERRED EMBODIMENTS

Figure 1:
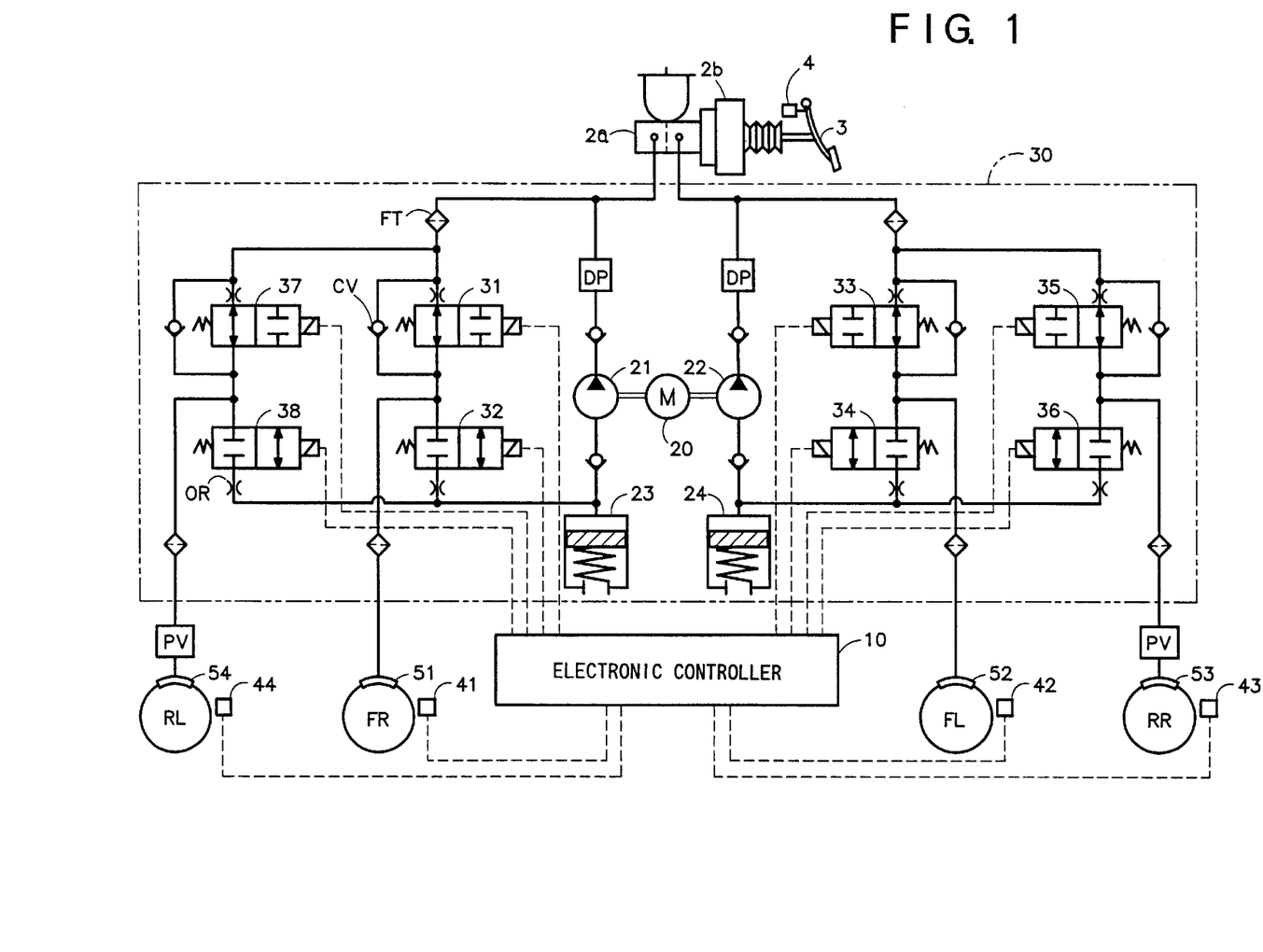
FIG. 1 is a block diagram illustrating an anti-skid control system according to an embodiment of the present invention.

Referring to FIG. 1, there is schematically illustrated an anti-skid control system according to an embodiment of the present invention, wherein a master cylinder 2a and a booster 2b are activated by a brake pedal 3 to serve as pressure generating means according to the present invention. Wheel brake cylinders 51 to 54 are operatively mounted on wheels FR, FL, RR, RL of the vehicle, respectively. The wheel FR designates the wheel at the front right side as viewed from the position of a driver's seat, the wheel FL designates the wheel at the front left side, the wheel RR designates the wheel at the rear right side, and the wheel RL designates the wheel at the rear left side. According to the present embodiment, a diagonal circuit (X-circuit) system is formed as shown in FIG. 1, while a front-rear dual circuit system may be formed.

Between the master cylinder 2a and the wheel brake cylinders 51 to 54, an actuator 30 is disposed for use in the anti-skid control (ABS). The actuator 30 serves as pressure control means according to the present invention. As enclosed by a two-dot chain line in FIG. 1, normally open solenoid valves 31, 37 are disposed in hydraulic pressure passages for connecting one output port of the master cylinder 2a with the wheel brake cylinders 51, 54, respectively, and an output port of a hydraulic pressure pump 21 is connected to a position between the master cylinder 2a and the valves 31, 37. Likewise, normally open solenoid valves 33, 35 are disposed in passages for connecting another output port of the master cylinder 2a with the wheel brake cylinders 52, 53, respectively, and an output port of a hydraulic pressure pump 22 is connected to a position between the master cylinder 2a and the valves 33, 35. The hydraulic pressure pumps 21, 22 are driven by an electric motor 20 to supply pressurized brake fluid into each hydraulic pressure passage. The wheel brake cylinders 51, 54 are connected to the normally closed solenoid valves 32, 38, the downstream side of which are connected to a reservoir 23 and the input port of the pump 21. The wheel brake cylinders 52, 53 are connected to the normally closed solenoid valves 34, 36, the downstream side of which are connected to a reservoir 24 and the input port of the pump 22. Each of the reservoirs 23, 24 has a piston and a spring as shown in FIG. 1 to store the brake fluid discharged from the wheel brake cylinders through the solenoid valves 32, 34, 36, 38.

The solenoid valves 31 to 38 are of two-port two-position solenoid operated changeover valves which are placed in their first operating positions as shown in FIG. 1 to communicate the wheel brake cylinders 51 to 54 with the master cylinder 2a. When the solenoids of the valves are energized, they are placed in their second operating positions to block the communication between the wheel brake cylinders 51 to 54 and the master cylinder 2a, and communicate the wheel brake cylinders 51 to 54 with the reservoir 23 or 24. In FIG. 1, "PV" indicates a proportioning valve, "DP" indicates a damper, "CV" indicates a check valve, "OR" indicates an orifice, and "FT" indicates a filter. Each check valve CV is provided for allowing the flow of the brake fluid from the wheel brake cylinders 51 to 54 and reservoirs 23, 24 toward the master cylinder 2a and preventing the reverse flow. With the solenoid valves 31 to 38 controlled to be energized or de-energized, the hydraulic braking pressure in the wheel brake cylinders 51 to 54 will be increased, decreased or held. That is, when the solenoid valves 31 to 38 are de-energized, the hydraulic braking pressure in the master cylinder 2a and the pressure pump 21 or 22 is supplied into the wheel brake cylinders 51 to 54 to increase the hydraulic braking pressure therein, whereas when the solenoid valves 31 to 38 are energized, the wheel brake cylinders 51 to 54 are communicated with the reservoir 23 or 24 to decrease the hydraulic braking pressure in the wheel brake cylinders 51 to 54. Or, when the solenoid valves 31, 33, 35, 37 are energized, and the solenoid valves 32, 34, 36, 38 are de-energized, the hydraulic braking pressure in the wheel brake cylinders 51 to 54 will be held. Therefore, by controlling the time period between the energizing the solenoid valves and de-energizing them, a hydraulic pressure control under a pulse pressure increase mode, or stepped pressure increase mode will be performed to increase the pressure gradually, or may be performed to decrease the pressure gradually.

The solenoid valves 31 to 38 are electrically connected to an electronic controller 10 to energize or de-energize each solenoid valve. The electric motor 20 is also connected to the controller 10 to be controlled thereby. Wheel speed sensors 41 to 44 are mounted on the wheels FR, FL, RR, RL to feed rotational speeds of the wheels, i.e., wheel speed signals to the controller 10, respectively. Furthermore, connected to the controller 10 are a brake switch 4 which is turned on when the brake pedal 3 is depressed, and etc. The electronic controller 10 is provided with a microcomputer (not shown) which includes a central processing unit (CPU), memories (ROM, RAM), a timer, an input interface, an output interface, and etc.

Figure 2A:
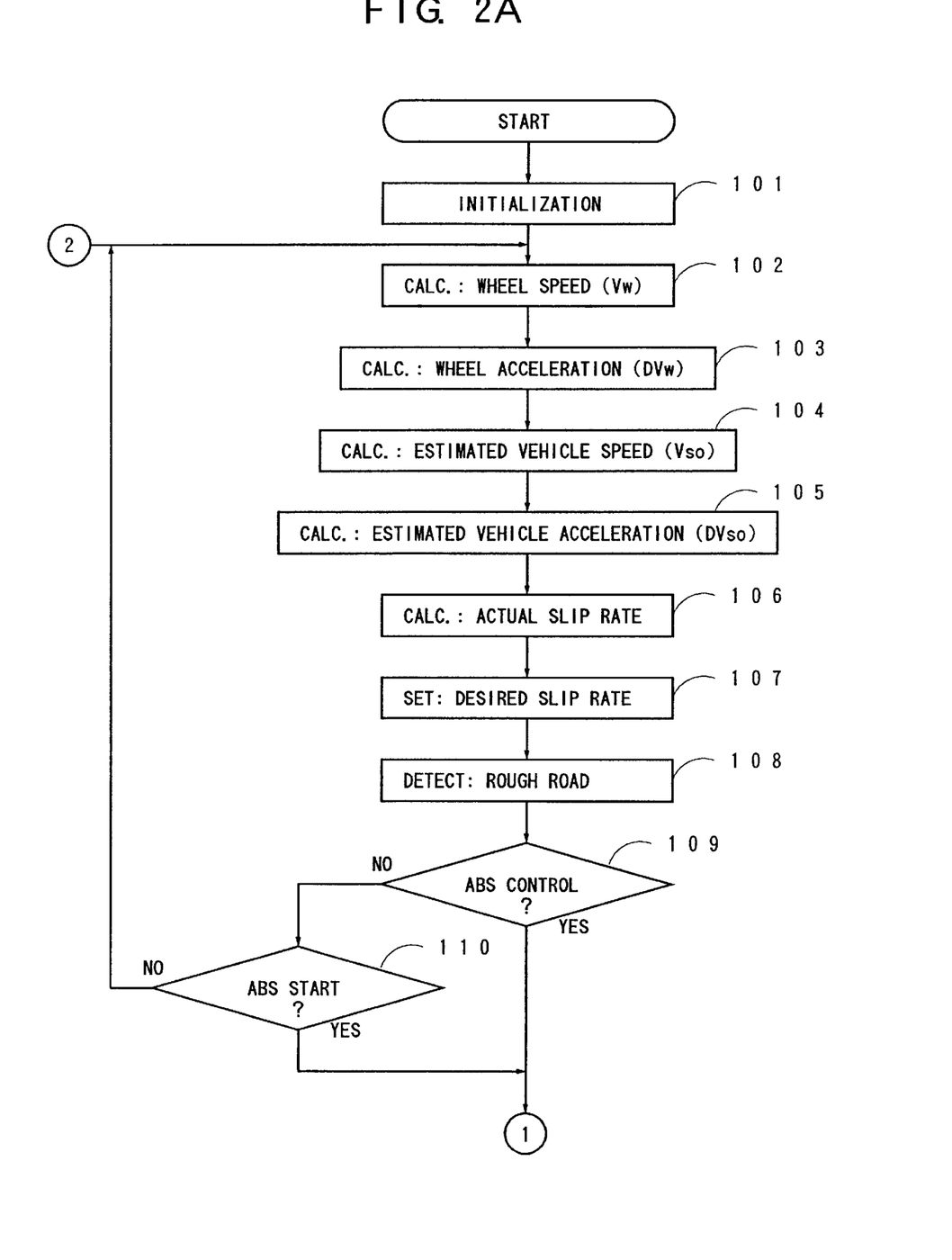
FIG. 2A and FIG. 2B are flowcharts showing a main routine of an anti-skid control according to an embodiment of the present invention.
Figure 2B:
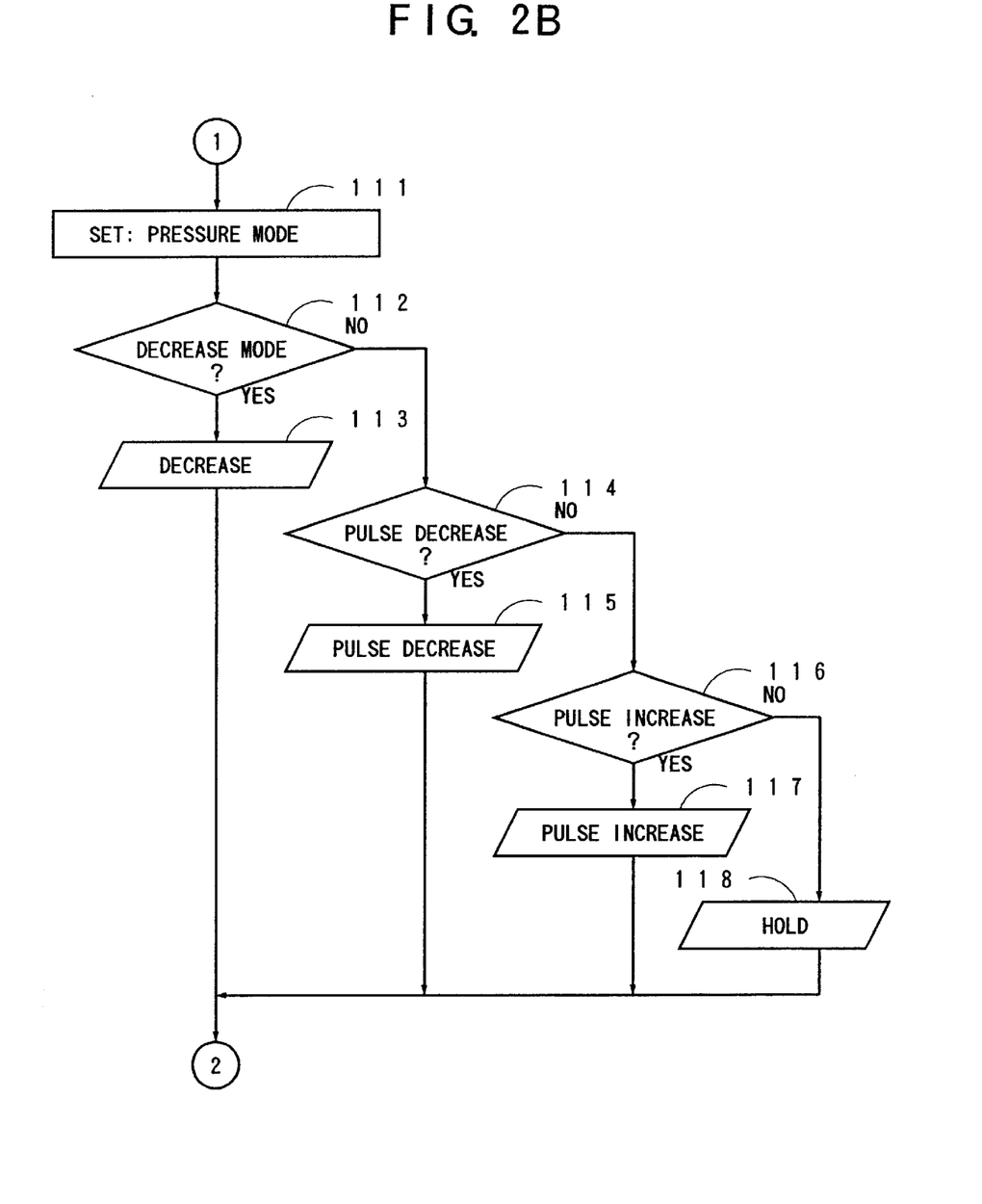

According to the present embodiment as constituted above, the anti-skid control operation will be performed by the controller 10 to control the actuator 30, in accordance with a program as shown in FIGS. 2A, 2B. The program routine starts when an ignition switch (not shown) is turned on. At the outset, the program provides for initialization of the system at Step 101 to clear various data. At Step 102, the signals detected by the wheel speed sensors 41 to 44 are read by the controller 10 to calculate each wheel speed (represented by "Vw"), and differentiated to provide a wheel acceleration (DVw). At Step 104, an estimated vehicle speed (Vso) is calculated on the basis of each wheel speed (Vw).

The estimated vehicle speed (Vso) may be calculated by $MED(\alpha_{DN}t, Vw, \alpha_{up}t)$ The "MED" indicates a function for obtaining an intermediate value. "$\alpha_{UP}$" is a value indicative of an upper limit side (to be greater than the wheel speed (Vw)) of the vehicle acceleration (including the deceleration), "$\alpha_{DN}$" is a value indicative of a lower limit side (to be smaller than the wheel speed (Vw)) of the vehicle acceleration (including the deceleration), and "t" indicates a time. The vehicle speed may be detected directly by a sensor for detecting the speed of the vehicle relative to the ground. Then, the program proceeds to Step 105, where the estimated vehicle speed (Vso) is differentiated to provide an estimated vehicle acceleration (DVso).

Next, the program proceeds to Step 106, where an actual slip rate of each wheel for use in the anti-skid control (represented by "Sa") is calculated on the basis of the wheel speed (Vw) and estimated vehicle speed (Vso), in accordance with the following equation:

$$Sa=(Vso-Vw)/Vso$$

Then, at Step 107, a desired slip rate (St) is set for each wheel, and at Step 108, is made a determination of a rough road which includes the unpaved road, stone pavement, snow road, and etc. The program further proceeds to Step 109, where it is determined whether the anti-skid control is being performed or not. Unless the anti-skid control is being performed, the program proceeds to Step 110 where a locking condition of each wheel is determined on the basis of the wheel speed (Vw) and wheel acceleration (DVw), for example, so as to determine whether the conditions for initiating the anti-skid operation have been fulfilled or not. If the conditions have been fulfilled, the program proceeds to Step 111 and Steps following it as shown in FIG. 2B, otherwise the program returns to Step 102. Then, at Step 111, one of the pressure modes including the pressure decrease mode, pulse pressure decrease mode, pulse pressure increase mode and hold mode is selected on the basis of the locking condition of each wheel, and the program proceeds to Steps 112–118, where pressure control signals are output in accordance with the selected pressure mode. Accordingly, the solenoid coils of the valves 31 to 38 are energized or de-energized, in accordance with the selected pressure mode, to increase, decrease or hold the hydraulic braking pressure in the wheel brake cylinders 51 to 54 (i.e., wheel cylinder pressure). Out of the pressure modes, the pulse pressure increase mode performed at Step 117 will be described later with reference to FIG. 3.

Figure 7:
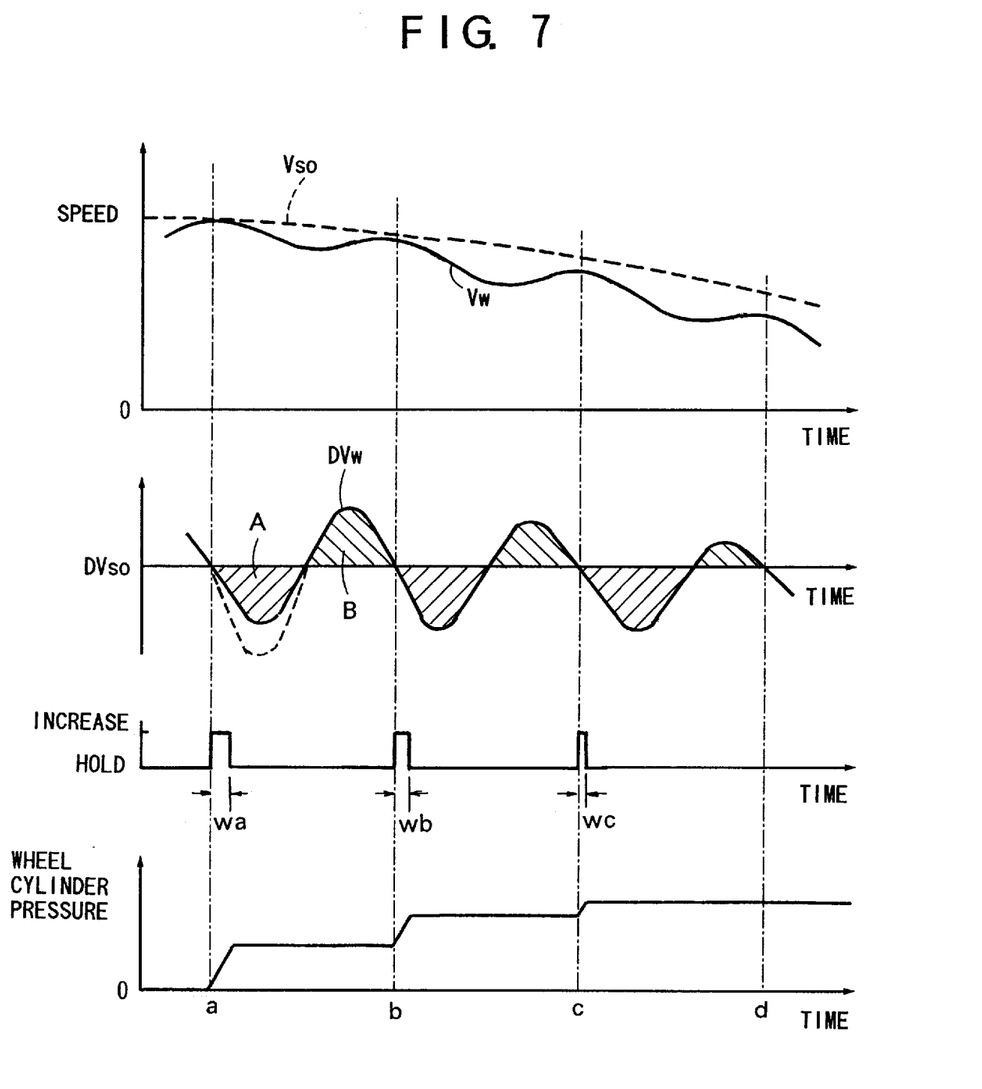
FIG. 7 is a diagram showing an example of variations of an estimated vehicle speed and a wheel speed, variation of a wheel acceleration to an estimated vehicle acceleration, and variations of a pressure increasing time and wheel cylinder pressure in a pulse pressure increase mode during an anti-skid control operation according to an embodiment of the present invention.

Hereinafter, the hydraulic braking pressure control performed at the pulse pressure increase mode according to the present embodiment, i.e., at a stage near the last stage of the anti-skid control operation, will be explained with reference to FIG. 7. The uppermost section in FIG. 7 shows variations of the estimated vehicle speed (Vso) and wheel speed (Vw), and the section next to the uppermost section shows a variation of the wheel acceleration (DVw) relative to the estimated vehicle acceleration (DVso). The third section from the uppermost section shows a pressure increasing time in the pulse pressure increase mode, and the lowest section in FIG. 7 shows a variation of the wheel cylinder pressure in the pulse pressure increase mode.

In FIG. 7, a position as indicted by "b", which represents that the wheel acceleration (DVw) comes to be lower than the estimated vehicle acceleration (DVso), is a point of inflection where the wheel acceleration (DVw) changes from a value greater than the estimated vehicle acceleration (DVso) to a value smaller than the estimated vehicle acceleration (DVso), so that it corresponds to a peak of the wheel speed (Vw) (hereinafter, referred to as a wheel speed peak) as can be seen from the uppermost section in FIG. 7. And, the deference between the wheel acceleration (DVw) and the estimated vehicle acceleration (DVso), i.e., the result of subtracting the wheel acceleration (DVw) from the estimated vehicle acceleration (DVso), corresponds to the area of the portion as indicated by hatching. The area (A) corresponds to the integrated value of the difference (DVso–DVw) at the lower side, while the area (B) corresponds to the integrated value of the difference (DVw–DVso) at the upper side. The ratio of the area (B) to the area (A), i.e., the ratio (=B/A) of the integrated value (B) to the integrated value (A) is reduced, in the rightward direction in FIG. 7, in other words, it is reduced in accordance with the elapsed time. This means that the ratio (B/A) will be reduced when the road $\mu$ gets close to its peak (near the position "d"). Therefore, it is so arranged that the pulse rise timing of the pressure increasing signal in the pulse pressure increase mode will coincide with the timing of the wheel speed peak when the wheel acceleration (DVw) comes to be lower than the estimated vehicle acceleration (DVso). And, it is so arranged that the pulse width of the pressure increasing signal will be reduced when the road $\mu$ gets close to its peak. That is, the pulse width will be reduced from the position "a" to "c" in FIG. 7, thereby to become the widths of (wa), (wb), (wc), and set to be zero (0) at the position "d" near the $\mu$ peak. As a result, the wheel cylinder pressure will be of a gradually increasing pressure characteristic, with the pressure increasing gradient reduced rightward as shown in the lowest section in FIG. 7, so that the braking force can be applied to the wheels with a good braking efficiency, near the $\mu$ peak.

According to the control of the pressure increasing signal in the above-described pulse pressure increase mode, the braking force can be applied to the wheels without being affected by the wheel vibration which is caused when the vehicle travels on a rough road. As well known heretofore, the equation of motion of a wheel can be formed as follows:

$$I \cdot d\omega/dt = Tt - Tb = \mu \cdot W \cdot r - Tb$$

where "I" is an inertia moment, "dω/dt" is an angular velocity of a wheel, "Tt" is a tire torque, "Tb" is a braking torque, "$\mu$" is a coefficient of friction of a road surface, "W" is a load applied to the wheel, and "r" is a radius of the wheel. The tire torque (Tt) can be substituted by the estimated vehicle acceleration (DVso). The product of (I·dω/dt) can be substituted by the wheel acceleration (DVw), and the braking torque (Tb) can be substituted by (K·ΔP) ("K" is a constant, and "ΔP" is an increased amount of pressure). Therefore, the equation of motion may be formed as follows:

$$DVw=DVso-K \cdot \Delta P$$

The above-described equation means that if the increased amount of pressure ($\Delta P$) is so controlled that the wheel acceleration (DVw) will become equal to the maximum vehicle speed (Dvsop) on the road surface, which is approximately equal to the estimated vehicle speed (DVso) during the anti-skid control operation, then the braking force can be applied to the wheel, holding the braking condition near the $\mu$ peak for a relatively long time. As a result, the vehicle speed will be effectively reduced to provide a proper braking efficiency.

In order to control the increased amount of pressure ($\Delta P$), it is necessary to determine whether the wheel acceleration (DVw) has become approximately equal to the estimated vehicle speed (DVso). However, when the wheel vibration occurs in such a case that the vehicle travels on a rough road, the wheel acceleration (DVw) will vary, so that it will be difficult to determine if the wheel acceleration (DVw) is approximately equal to the estimated vehicle speed (DVso). According to the present embodiment, therefore, the wheel speed peak is detected on the basis of the relative variation between the wheel acceleration (DVw) and the estimated vehicle speed (DVso), and the rise timing and pressure increasing time of the pressure increasing signal in the pulse pressure increase mode are set at the time when the wheel speed peak is detected.

Figure 3:
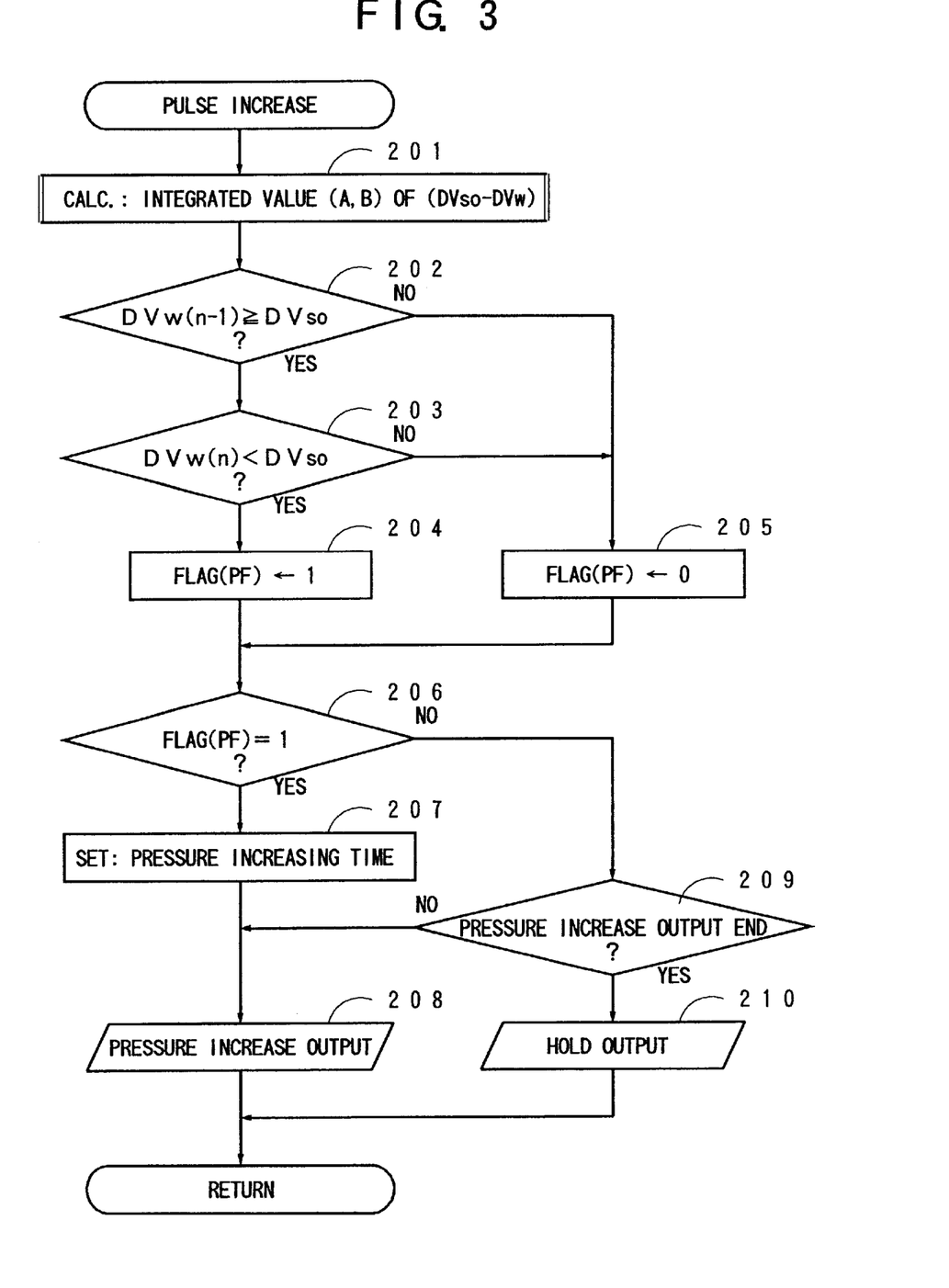
FIG. 3 is a flowchart showing a sub-routine of operation in a pulse pressure increase mode according to an embodiment of the present invention.

FIG. 3 shows the pulse pressure increase mode executed at Step 117 in FIG. 2B. At Step 201, the difference (DVso−DVw), which is obtained by subtracting the wheel acceleration (DVw) obtained at Step 103 from the estimated vehicle acceleration (DVso) obtained at Step 105, is integrated to provide the integrated value (A), (B), as will be described later in detail with reference to FIG. 4. Then, the wheel speed peak is detected at Steps 202, 203. That is, after it was determined at Step 202 that the wheel acceleration (DVw(n−1)) detected at the previous cycle was greater than the estimated vehicle acceleration (DVso), if it is determined at Step 203 that the wheel acceleration (DVw(n)) detected at the present cycle becomes lower than the estimated vehicle acceleration (DVso), it means that the wheel acceleration (DVw) has passed the point of inflection (e.g., the position "b" in FIG. 7), where the wheel acceleration (DVw) is varied from the value greater than the estimated vehicle acceleration (DVso) to the value smaller than the estimated vehicle acceleration (DVso), so that it is determined that the wheel speed peak exists.

When the wheel speed peak is detected by comparing the wheel acceleration (DVw) with the estimated vehicle acceleration (DVso) in magnitude through Steps 202, 203, the program proceeds to Step 204 where the pulse pressure increase mode adjusting flag "PF" is set (1). In the case where it was determined at Step 202 that the wheel acceleration (DVw(n−1)) detected at the previous cycle was smaller than the estimated vehicle acceleration (DVso), or it is determined at Step 203 that the wheel acceleration (DVw (n)) detected at the present cycle is equal to or greater than the estimated vehicle acceleration (DVso), the program proceeds to Step 205 where the pulse pressure increase mode adjusting flag "PF" is reset to be zero. At Steps 202, 203, (n) was added to distinguish the datum of the present cycle from that of the previous cycle, which are detected with a predetermined time period, such as the wheel acceleration (DVw(n)) at the present cycle. Hereinafter, however, (n) is omitted to simply indicate by the wheel acceleration (DVw).

Then, the pulse pressure increase mode adjusting flag "PF" is determined at Step 206. If the flag has been set, the program proceeds to Step 207, where the pressure increasing time in the pulse pressure increase mode is set, and the pressure increasing signal is output at Step 208. The timing for increasing the pressure corresponds to the wheel speed peak, where the wheel acceleration (DVw) is varied from the value greater than the estimated vehicle acceleration (DVso) to the value smaller than the estimated vehicle acceleration (DVso), e.g., the position "b" in FIG. 7. With respect to the pressure increasing time set at Step 207 will be described later with reference to FIGS. 5 and 6. On the contrary, if it is determined at Step 206 that the pulse pressure increase mode adjusting flag "PF" has not been set, the program proceeds to Step 209 where the condition for terminating the pressure increasing output is determined. If it is determined at Step 209 that the pressure increasing output is to be terminated, the program proceeds to Step 210 where the hold signal is output.

Figure 4:
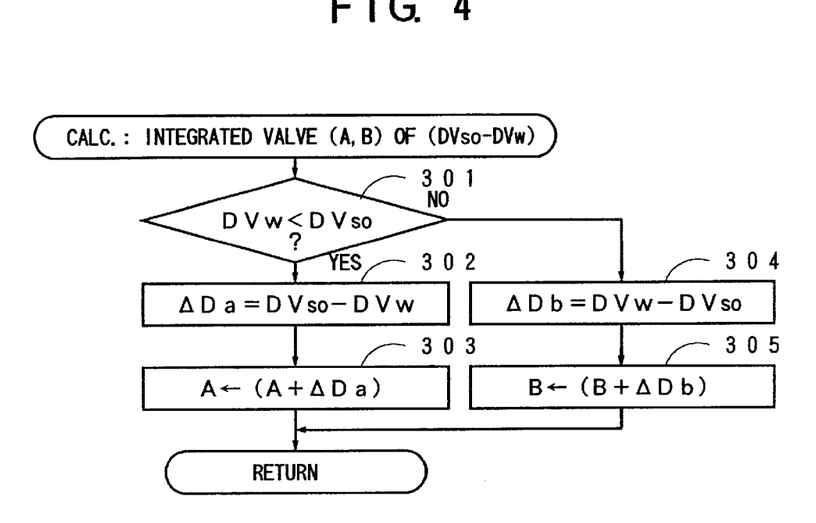
FIG. 4 is a flowchart showing calculation of integrated values A, B of the difference between an estimated vehicle acceleration (DVso) and a wheel acceleration (DVw) according to an embodiment of the present invention.

FIG. 4 shows the calculation of the integrated values (A), (B) of the difference (DVso−DVw), which is obtained by subtracting the wheel acceleration (DVw) from the estimated vehicle acceleration (DVso) at Step 201 in FIG. 3. At Step 301, the wheel acceleration (DVw) and the estimated vehicle acceleration (DVso) are compared in magnitude. When it is determined that the wheel acceleration (DVw) calculated at Step 103 is smaller than the estimated vehicle acceleration (DVso) calculated at Step 105, the difference (DVso−DVw) is calculated at step 302 to provide a difference ($\Delta Da$) (=DVso−DVw). And, at step 303, the difference ($\Delta Da$) is added to the integrated value (A) to renew the integrated value (A). Whereas, if it is determined at Step 301 that the wheel acceleration (DVw) is equal to or greater than the estimated vehicle acceleration (DVso), the difference (DVw−DVso) is calculated at step 304 to provide a difference ($\Delta Db$) (=DVw−DVso). And, the difference ($\Delta Db$) is added to the integrated value (B) to renew the integrated value (B). Thus, the difference between the wheel acceleration (DVw) and the estimated vehicle acceleration (DVso) is calculated to provide always the difference of positive value, and added to the integrated values (A), (B), each of which corresponds to the area of each portion with hatching as shown in FIG. 7, respectively.

Figure 5:
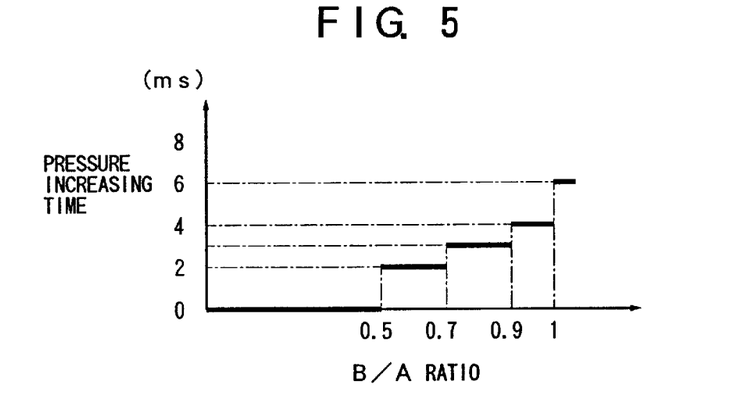
FIG. 5 is a diagram showing an example of setting a pressure increasing time in a pulse pressure increase mode set at Step 207 in FIG. 3.

FIG. 5 shows an example of setting the pressure increasing time set at Step 207 in FIG. 3. At the outset, is calculated the ratio (B/A) of the integrated value (B) obtained at step 305 and the integrated value (A) obtained at step 303. In accordance with the ratio (B/A), the pressure increasing time, which was preset according to the ratio (B/A) as shown in FIG. 5, is selected. In FIG. 5, for example, if the ratio (B/A) is 0 to 0.5, the pressure increasing time in the pulse pressure increase mode is set to be zero (0). If the ratio (B/A) is 0.5 to 0.7, the pressure increasing time is set to be 2 milliseconds. If the ratio (B/A) is 0.7 to 0.9, the pressure increasing time is set to be 3 milliseconds. If the ratio (B/A) is 0.9 to 1.0, the pressure increasing time is set to be 4 milliseconds. And, if the ratio (B/A) is equal to or more than 1.0, the pressure increasing time is set to be 6 milliseconds. These values are merely examples, and may be set to be other values. Therefore, since the ratio (B/A) is 0.9 at the position "b" in FIG. 7, for example, the pressure increasing time (wb) in the pulse pressure increase mode is set to be 4 milliseconds. Whereas, since the ratio (B/A) is 0.5 at the position "d", the pressure increasing time in the pulse pressure increase mode is set to be zero.

Figure 6:
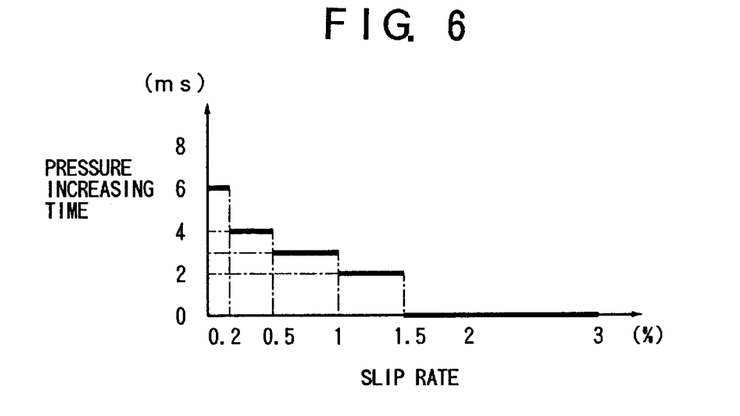
FIG. 6 is a diagram showing another example of setting the pressure increasing time in a pulse pressure increase mode set at Step 207 in FIG. 3.

FIG. 6 shows another example of setting the pressure increasing time. On the basis of the actual slip rate (Sa) (=(Vso−Vw)/Vso) of the wheel calculated at Step 106, the pressure increasing time is selected from those values preset in accordance with the slip rates as shown in FIG. 6. For example, if the slip rate is 0 to 0.2%, the pressure increasing time in the pulse pressure increase mode is set to be 6 milliseconds. If the slip rate is 0.2% to 0.5%, the pressure increasing time is set to be 4 milliseconds. If the slip rate is 0.5% to 1.0%, the pressure increasing time is set to be 3 milliseconds. If the slip rate is 1.0% to 1.5%%, the pressure increasing time is set to be 2 milliseconds. And, if the slip rate is equal to or more than 1.5%, the pressure increasing time is set to be zero. Those values are also merely examples, and may be set to be other values. Therefore, since the slip rate is 0.2% to 0.5% at the position "b" in FIG. 7, the pressure increasing time in the pulse pressure increase mode is set to be 4 milliseconds. Whereas, since the actual slip rate (Sa) comes to be a value close to the $\mu$ peak at the position "d" in FIG. 7, the pressure increasing time in the pulse pressure increase mode is set to be zero. Consequently, the anti-skid control can be performed with a proper braking efficiency.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. An anti-skid control system for an automotive vehicle comprising:

wheel brake cylinders operatively mounted on wheels of said vehicle, respectively;

pressure generating means for pressurizing brake fluid in response to operation of a manually operated member to generate a hydraulic braking pressure and supply the hydraulic braking pressure to each of said wheel brake cylinders;

pressure control means disposed between said wheel brake cylinders and said pressure generating means, said pressure control means setting at least a pressure decrease mode for decreasing the hydraulic braking pressure and a pulse pressure increase mode for intermittently increasing the hydraulic braking pressure, with a pressure increasing signal provided in accordance with the braking condition of said vehicle, to control the hydraulic braking pressure in each of said wheel brake cylinders;

wheel acceleration detection means for detecting a wheel acceleration of each wheel of said vehicle;

vehicle acceleration detection means for detecting a vehicle acceleration of said vehicle;

wheel speed peak detection means for detecting peaks of the wheel speed in the pulse pressure increase mode continuously on the basis of a variation of the wheel acceleration detected by said wheel acceleration detection means relative to the vehicle acceleration detected by said vehicle acceleration detection means; and pulse pressure increase mode adjusting means for setting the time when each peak of the wheel speed was detected by said wheel speed peak detection means as a rise timing of the pressure increasing signal in the pulse pressure increase mode, and adjusting a time period for which the pressure increasing signal outputs, on the basis of a variation of the rotating condition of said wheel at the time when the peak of the wheel speed was detected.

2. An anti-skid control system as set forth in claim 1, wherein said pulse pressure increase mode adjusting means is adapted to adjust the time period for which the pressure increasing signal outputs, on the basis of a ratio of a first integrated value of a difference obtained by subtracting the vehicle acceleration from the wheel acceleration, to a second integrated value of a difference obtained by subtracting the wheel acceleration from the vehicle acceleration.

3. An anti-skid control system as set forth in claim 2, wherein said pulse pressure increase mode adjusting means is adapted to set the time period to be shorter, with the ratio of the first integrated value to the second integrated value being reduced.

4. An anti-skid control system as set forth in claim 1, further comprising:

wheel speed detection means for detecting wheel speeds of said wheels of said vehicle;

vehicle speed detection means for detecting a vehicle speed of said vehicle; and slip rate calculation means for calculating a slip rate on the basis of the wheel speeds detected by said wheel speed detection means and the vehicle speed detected by said vehicle speed detection means, and wherein said pulse pressure increase mode adjusting means is adapted to adjust the time period for which the pressure increasing signal is output, on the basis of the slip rate calculated by said slip rate calculation means at the time when the peak of the wheel speed was detected.

5. An anti-skid control system as set forth in claim 4, wherein said pulse pressure increase mode adjusting means is adapted to set the time period to be shorter, with the slip rate calculated by said slip rate calculation means being close to the slip rate at a peak of the coefficient of friction of said road.

6. An anti-skid control system as set forth in claim 1, further comprising wheel speed detection means for detecting wheel speeds of said wheels of said vehicle, wherein said wheel acceleration detection means is adapted to differentiate the wheel speed to obtain the wheel acceleration, and wherein said vehicle acceleration detection means is adapted to calculate an estimated vehicle speed on the basis of the wheel speeds, and differentiate the estimated vehicle speed to obtain the vehicle acceleration.

* * * * *